M. W. Kidder,
Damper.
No. 62,341.  Patented Feb. 20, 1867.
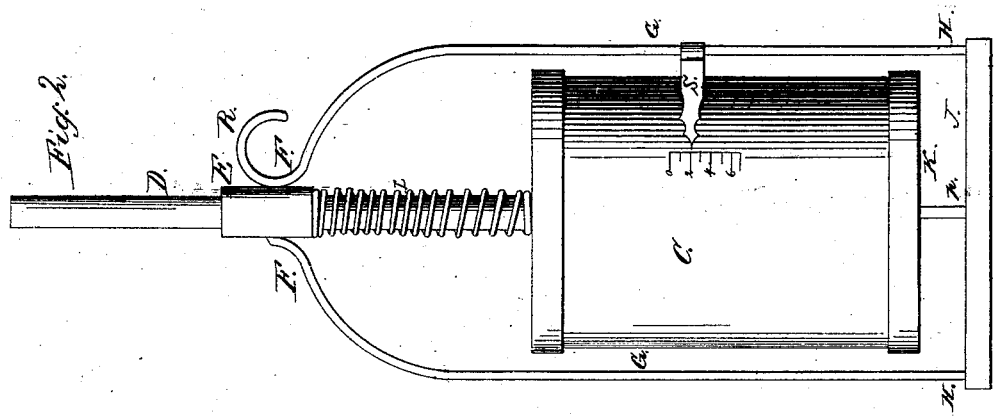
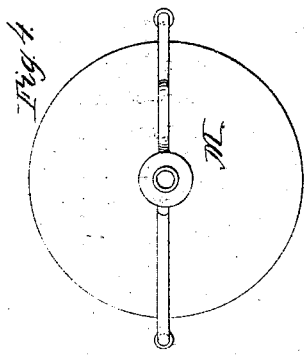 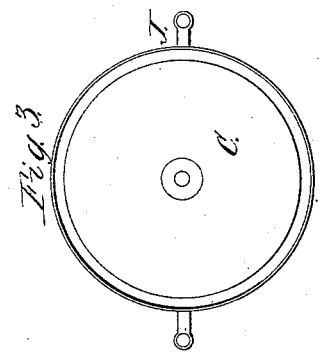 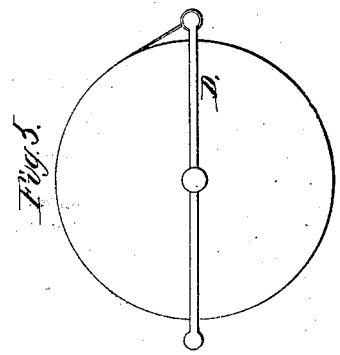
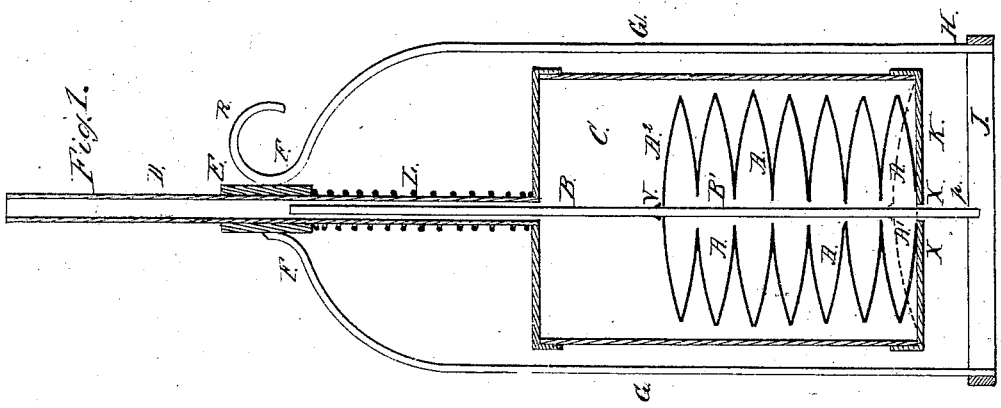
Witnesses.
John E. Greene
J. J. Whitney
Inventor.
Moses W. Kidder

United States Patent Office.

MOSES W. KIDDER, OF LOWELL, MASSACHUSETTS, ASSIGNOR TO HIMSELF AND H. R. BARKER, OF SAME PLACE.

Letters Patent No. 62,341, dated February 26, 1867.

IMPROVEMENT IN DAMPERS.

The Schedule referred to in these Letters Patent and making part of the same.

TO ALL WHOM IT MAY CONCERN:

Be it known that I, MOSES W. KIDDER, of Lowell, in the county of Middlesex, and State of Massachusetts, have invented a new and useful Improvement in Fire Regulators, which are the apparatus or device connected with or arranged near steam boilers or other furnaces, and actuated by steam or other expansive gas, vapor, or fluid, to open and close the damper or dampers automatically, and admit a greater or a less quantity of atmospheric air to the fire; and I hereby declare the following to be a full, clear, and exact description of the same, reference being had to the accompanying drawings, making a part of this specification, in which—

Figure 1 is a central longitudinal section.
Figure 2, a side elevation.
Figure 3, a transverse section.
Figure 4, a top; and
Figure 5, a bottom end view.

This invention consists in the employment of a series of concavo-convex disks or washers, A, plain or corrugated, and arranged upon a central rod, B, and enclosed within a cylinder, C, which has an induction pipe D, entering at one end, and extending outward and through a hub E, connected with ends F of the curved portions of two parallel rods G, the opposite ends H of which terminate in and near the extremities of a cross-head, J, a short distance from the end K of the cylinder. The central and outer edges of the disks A are soldered together. One disk, $A^1$, nearest the head K of the cylinder, is soldered or otherwise fastened at X to the said cylinder head, and the disk $A^2$, at the opposite extremity of the series of disks, is also fastened or soldered at V to the rod B, thus forming a sort of metallic bellows. The rod B is loose in the head K of the cylinder, the space around said rod admitting ingress and egress of air within and around the concavities of the disks, and the enclosed portion $B'$ of the rod. A spiral spring, L, surrounds the pipe D between the movable hub E and the head M of the cylinder. This spring acting against the hub E, connected with the rods G, the cross-head J, and the end $p$ of the central rod B, serves to distend the series of disks and hold them in the desired position to be acted upon by steam or its equivalent admitted through the pipe D.

To put in operation my improved fire regulator the cylinder is secured to some suitable support at any convenient distance from the boiler, or to the same, and the lever or other connection for opening and closing the draught damper attached to the cross-head J, to either or both of the rods G, the hub E, or the hook R, and the steam admitted through the pipe D to the interior of the cylinder around the convex surfaces of the disks. When the damper is open, and the fire beneath the boiler burns freely, steam is generated rapidly, and the pressure momentarily increases. This increased pressure acts instantly upon the disks within the cylinder, consequently upon the cross-head, the rods and damper connections, and closes the damper which checks the draught, thereby reducing the fire and stopping the rapid generating of steam. When the steam in the boiler is low or decreasing, the action of the steam on the disks is limited, and the damper will be proportionably opened, the draught increased, the fire rekindled, to generate steam more rapidly. By this operation of the regulator, damper, draught, and fire, the steam in the boiler is kept at or near a uniform pressure, which produces a uniform action of the regulator and damper connections, the pressure of steam acting upon the regulator, and the regulator controlling the pressure of steam, through the damper and connections, and the fire beneath the boiler.

The number of disks employed in the cylinder must be in proportion to the amount of motion required to open the damper; and when a very limited motion will answer the purpose, say one-fourth of an inch, a single concavo-convex disk will be sufficient, as shown in red lines in fig. 1. But to insure easy action, and allow for considerable motion, say two to six inches, I employ from ten to fifty or more disks, and then I obtain all the motion desired. A pointer, S, on one of the rods G points to indicating marks 0, 2, 4, 6, or indicator, shown in fig. 2, by which may be known the pressure of steam in the boiler, thus serving as a regulator or steam gauge, or pressure gauge, for indicating the pressure of steam in boilers.

What I claim as new, and desire to secure by Letters Patent, is—

The employment of one or more metallic disks or plates, corrugated or plain, in the manner and for the purpose specified.

MOSES W. KIDDER.

Witnesses:
JOHN E. CRANE,
J. S. WHITNEY.